(12) United States Patent
Mese

(10) Patent No.: US 9,311,337 B2
(45) Date of Patent: Apr. 12, 2016

(54) IMAGE SUBSET DETERMINATION AND PROCESSING

(71) Applicant: Broadcom Corporation, Irvine, CA (US)

(72) Inventor: Murat Mese, RPV, CA (US)

(73) Assignee: BROADCOM CORPORATION, Irvine, CA (US)

( * ) Notice: Subject to any disclaimer, the term of this patent is extended or adjusted under 35 U.S.C. 154(b) by 165 days.

(21) Appl. No.: 13/743,598

(22) Filed: Jan. 17, 2013

(65) Prior Publication Data

US 2014/0177970 A1    Jun. 26, 2014

Related U.S. Application Data

(60) Provisional application No. 61/740,043, filed on Dec. 20, 2012.

(51) Int. Cl.
*G06F 17/30* (2006.01)
(52) U.S. Cl.
CPC ............................... *G06F 17/30247* (2013.01)
(58) Field of Classification Search
None
See application file for complete search history.

(56) References Cited

U.S. PATENT DOCUMENTS

| 2008/0082426 | A1* | 4/2008 | Gokturk et al. | 705/27 |
| 2012/0114248 | A1* | 5/2012 | Yang et al. | 382/190 |
| 2012/0155717 | A1* | 6/2012 | Ma et al. | 382/118 |
| 2014/0074986 | A1* | 3/2014 | Stoop et al. | 709/219 |

FOREIGN PATENT DOCUMENTS

| JP | 2006-302093 | * 11/2006 | G06F 13/00 |
| JP | 2006302093 A1 | * 11/2006 | G06F 13/00 |

OTHER PUBLICATIONS

Zhou et al, A Generalized Relevance Feedback Scheme for Image Retrieval, 2004, Proceedings of SPIE vol. 4210, pp. 347-354.*
Nakazato et al, ImageGrouper: a group-oriented user interface for content-based image retrieval and digital image arrangement, 2003, Journal of Visual Languages and Computing & Computing 14 (2003), pp. 363-386.*

* cited by examiner

*Primary Examiner* — David F Dunphy
(74) *Attorney, Agent, or Firm* — Oblon, McClelland, Maier & Neustadt, L.L.P.

(57) ABSTRACT

Aspects of a device, system, and method for subset determination and processing are described. In certain aspects, a process for subset determination includes determining a reference for correlation with at least one image and identifying a set of images for comparison with the reference. The reference for correlation may be specified by a user based on a desire to determine a subset of certain images from a larger group. The process further includes determining a subset of the set of images based on a correlation between the reference and the set of images. According to various features, a subset of images that not only includes certain images but also excludes certain images may be determined quickly.

20 Claims, 11 Drawing Sheets

Subset Routine Menu

① Define Routine

Routine Name _____

② Select Rules and/or Conditions of Routine

Onset Rule: [Select Onset Rule ▼]
- Time
- Date
- Location
- Available Memory
- Available Battery Capacity
- Comm Signal Strength Value _____

Subset Rule: [Select Subset Rule]
- Save
- Delete
- Upload
- Post-Process

Path / Service _____
Username _____
Password _____

③ Select Image(s) for Comparision

Path _____
Date Range _____

[Browse]

④ Select Reference(s)

☐ Prompt User to Select
☐ Select From Database

For Inclusion [Select Reference ▼]
- John
- Sara
- Mike

For Exclusion [Select Reference ▼]
- John
- Sara
- Mike

[Save Routine]

*FIG. 6*

IMAGE SUBSET DETERMINATION AND PROCESSING

CROSS REFERENCE TO RELATED APPLICATIONS

This application claims the benefit of and priority to U.S. Provisional Patent Application No. 61/740,043, titled "IMAGE SUBSET DETERMINATION AND PROCESSING," filed Dec. 20, 2012, the contents of which is hereby incorporated herein by reference in its entirety.

BACKGROUND

Today, with image sensors being combined into many types of portable devices such as cellular telephones and tablets computers, for example, electronic images are being generated in greater volume. In many cases, many of the images may not be suitable for distribution or presentation for various reasons. Unsuitable images may be difficult to identify, especially when distributed among larger groups of images. Identifying images for saving, deleting, or distribution can therefore be very time consuming. In many cases, rather than maintaining a database of only desirable or suitable images, every image captured by an image sensor is stored. These large volumes of image data require additional storage capacity, which is costly.

While images may be transferred from one computing device to a computer that hosts a social networking website or image sharing/storage service, it may be undesirable to transfer an entire database of those images without separating certain ones not suitable for transfer. In some cases, before transferring images to a server, it may be desirable to remove those that do not include images of a child or minor, for privacy concerns. It may also be desirable to transfer only images that include an image of a certain individual. Especially in cases where many images are involved, it can be difficult to efficiently determine a desired subset of images in view of these considerations.

BRIEF DESCRIPTION OF THE DRAWINGS

For a more complete understanding of the embodiments and the advantages thereof, reference is now made to the following description, in conjunction with the accompanying figures briefly described as follows:

FIG. 6 illustrates an example interface of a subset routine menu according to an example embodiment;

DETAILED DESCRIPTION

Figure 1:
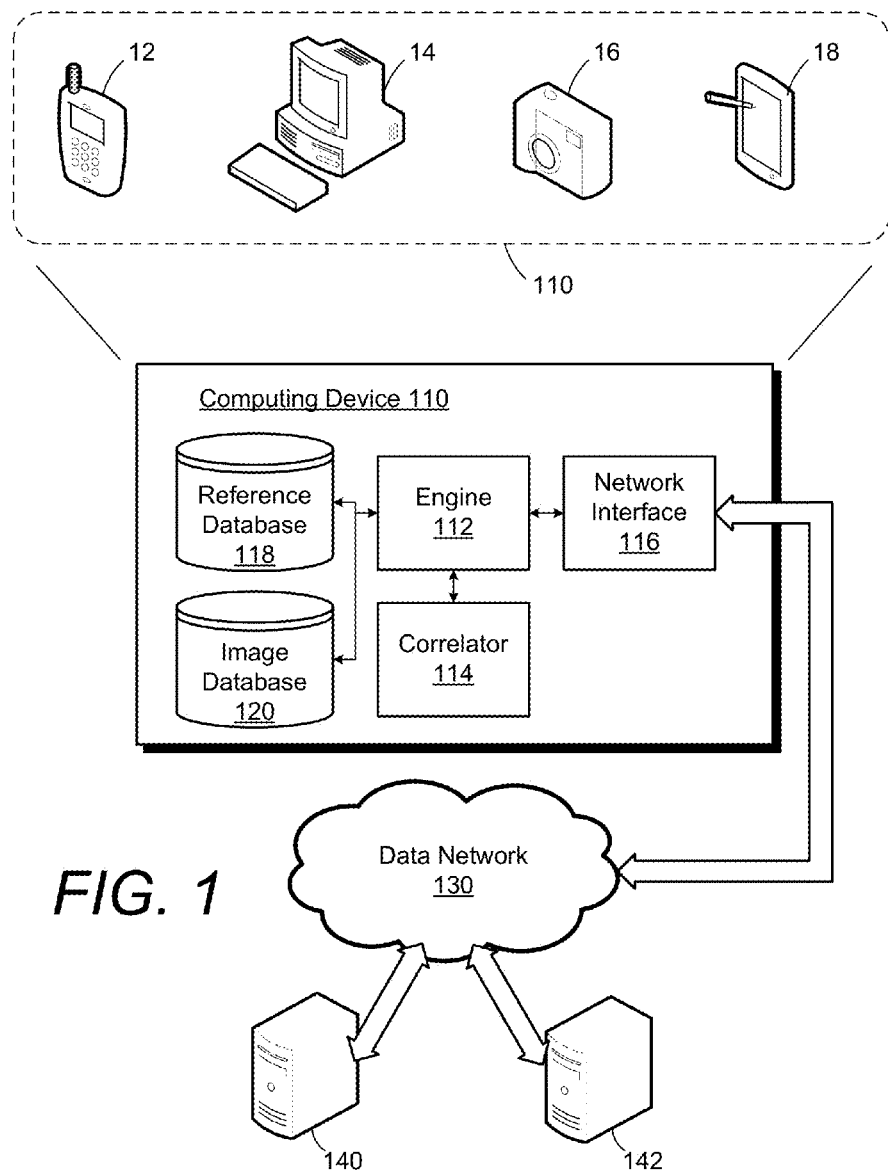
FIG. 1 illustrates a device and network for image subset determination and processing according to an example embodiment.

The drawings illustrate certain embodiments and are therefore not to be considered limiting of the scope of the embodiments described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions or positions may be exaggerated to help visually convey certain principles. In the drawings, similar references numerals between figures designate like or corresponding, but not necessarily the same, elements.

In the following paragraphs, the embodiments are described in further detail by way of example with reference to the attached drawings. In the description, well known components, methods, and/or processing techniques are omitted or briefly described so as not to obscure an understanding of the embodiments.

The embodiments described herein are not limited in application to the examples set forth. Also, the terminology used herein is for the purpose of description and should not be regarded as limiting. The use of "including," "comprising," or "having" and variations thereof is meant to encompass the elements listed thereafter and equivalents thereof as well as additional elements.

With image sensors being combined into many types of portable devices, such as cellular telephones and tablets computers, for example, electronic images are being generated in greater volume. In many cases, many of the images may not be suitable for distribution or presentation for various reasons. Unsuitable images may be difficult to identify, especially when distributed among larger groups of images. While images may be transferred from one computing device to a computer that hosts a social networking website or image sharing/storage service, it may be undesirable to transfer an entire database of those images without separating certain ones not suitable for transfer. In some cases, before transferring images to a server, it may be desirable to remove those that do not include images of a child or minor, for privacy concerns.

According to aspects of the embodiments described herein, processes for image subset determination and post-selection processing are described. The processes may automate tasks associated with separating certain unsuitable images, for various reasons. Alternatively or additionally, the processes may help automate tasks associated with separating particular images from a larger group of images in a time-effective manner.

Turning now to the drawings, certain embodiments are described in detail.

FIG. 1 illustrates a device and network for image subset determination and processing according to one example embodiment. In FIG. 1, a computing device 110 and servers 140 and 142 are illustrated. The computing device 110 is communicatively coupled to a data network 130 and, thus, to the servers 140 and 142. The computing device 110 and the servers 140 and 142 are configured to communicate data between each other over the data network 130 using any known data communications protocol or service. For example, the data network 130 may comprise a packet-based data network, and the computing device 110 may communicate with the servers 140 and 142 using the TCP/IP protocol. In certain embodiments, as discussed below, the data network 130 may be omitted.

In various embodiments, the computing device 110 may be embodied as a cellular phone 12, computer 14, camera 16, tablet 18, or other similar device, without limitation. It should be appreciated that the phone 12, computer 14, camera 16, and tablet 18 devices are discussed herein by way of example only, and the embodiments described herein may be implemented in any computing device suitable for the application.

In certain embodiments, the computing device 110 comprises an engine 112, a correlator 114, a network interface 116, a reference database 118, and an image database 120. In various embodiments, the engine 112, correlator 114, and network interface 116 may be embodied as circuitry or functional logic, a processor directed by computer-executable software, or combinations thereof, as discussed in further detail below.

The engine 112 may be configured to coordinate the aspects of the subset determination processes described herein. For example, the engine 112 may be configured to coordinate the activities of the correlator 114 and the network interface 116 and access the reference and image databases 118 and 120 to retrieve data for processing. Further, the engine 112 may be configured to access the reference and image databases 118 and 120 to retrieve data for processing by the correlator 114. Additionally, the engine 112 may be configured to monitor one or more rules and conditions defined by the rules, for directed processing, as described in further detail below.

In certain aspects, the engine 112 may be further configured to determine a reference for correlation and identify a set of images for comparison with the reference. Thus, the engine 112 may coordinate data required for processing by, for example, the correlator 114. In various embodiments, the reference for correlation may be a predetermined image, a portion of a predetermined image, an image reference metric, or determined according to or in response to a prompt for selection of the reference. In certain embodiments, the reference for correlation may be determined based in part on conditions of a subset rule. The set of images for comparison with the reference may be a predetermined set of images, a set of images determined based in part on conditions of a subset rule, or determined according to or in response to a prompt for selection of the set of images.

The correlator 114 may be configured to correlate a reference for correlation with each image in a set of images for correlation. As described herein, a correlation of images by the correlator 114 may comprise, at least, a comparison of the images. In other words, when the correlator 114 correlates a reference for correlation with an image from a set of images, the correlator 114 compares the reference for correlation with the image from the set of images to determine whether they share similar or corresponding features. In this context, the correlator 114 may be configured to ascertain whether the image from the set of images contains a certain pattern of pixels, for example, that is similar in nature to that contained within the reference for correlation. In one embodiment, the correlator 114 may determine whether a correlation value, generated by a comparison of an image with a reference, exceeds a correlation threshold. In this context, when the correlation value exceeds the correlation threshold, a "match" is determined and, when the correlation value does not exceed the correlation threshold, no "match" is determined to exist. In the description below, correlations to identify facial features and landmarks are described by way of example, although the processes and features described herein are not limited to use in such context.

While a comparison of pixels between an image and a reference for correlation is provided by way of example, it is noted that the use of various correlation algorithms is within the scope and spirit of the embodiments described herein. That is, additionally or alternatively to relying upon a pixel comparison, the correlator 114 may rely upon other metrics or heuristics for determining whether an image from a set of images is similar or a match to a reference for correlation. For example, an image from a set of images may be determined to be similar to a reference for correlation based upon timing- or location-based comparisons in addition to pixel-based comparisons. In certain embodiments, an image may be determined to be similar to a reference for correlation based upon a weighted average of timing-, location-, and pixel-based comparisons, for example.

As discussed above, it is also noted that a reference for correlation may comprise a predetermined image, portion of a predetermined image, image reference metric, or any combination thereof, without limitation. An image reference metric may comprise timing- or location-based data or metadata in addition to pixels, pixel values, and/or other pixel- or image-based data, for example. Similarly, each image in a set of images may comprise timing- or location-based data in addition to pixels, pixel values, and/or other metrics, for example.

The correlator 114, in connection with the engine 112, may be configured to determine a subset of images based on a correlation between a reference for correlation and a set of images for correlation. For example, the correlator 114 may be configured to correlate the reference for correlation with each image in the set of images for correlation, and add an image from the set to a subset when it correlates with the reference for correlation. Additionally, the correlator 114 may be configured to exclude an image from the subset, if the image does not correlate with the reference for correlation.

In certain embodiments, a reference for correlation may comprise both a reference for inclusion and a reference for exclusion. In this case, the correlator 114 may be configured to determine a subset of a set of images by, for each image of the set of images, correlating the image with the references for inclusion and exclusion. The correlator 114 may be further configured to add the image to the subset of images when the image correlates with the reference for inclusion and does not correlate with the reference for exclusion, but exclude the image from the subset of images when the image correlates with the reference for exclusion.

As described in further detail below, in connection with the determination of a subset of images from a set, the engine 112 may be configured to perform additional processing. For example, the engine 112 may run an image processing algorithm on each image in the subset of images, delete each image in the subset of images, or transfer each image in the subset of images to the server 140 and/or 142. The engine 112 may perform other types of processing on one or more images of the subset, in various embodiments. According to aspects described herein, a subset of images may be quickly determined. Embodiments described herein may rely upon certain processing rules to further automate the selection of a reference for correlation, the selection of a subset of images to be compared with the reference, and the transfer of the subset of images to a server.

Figure 2:
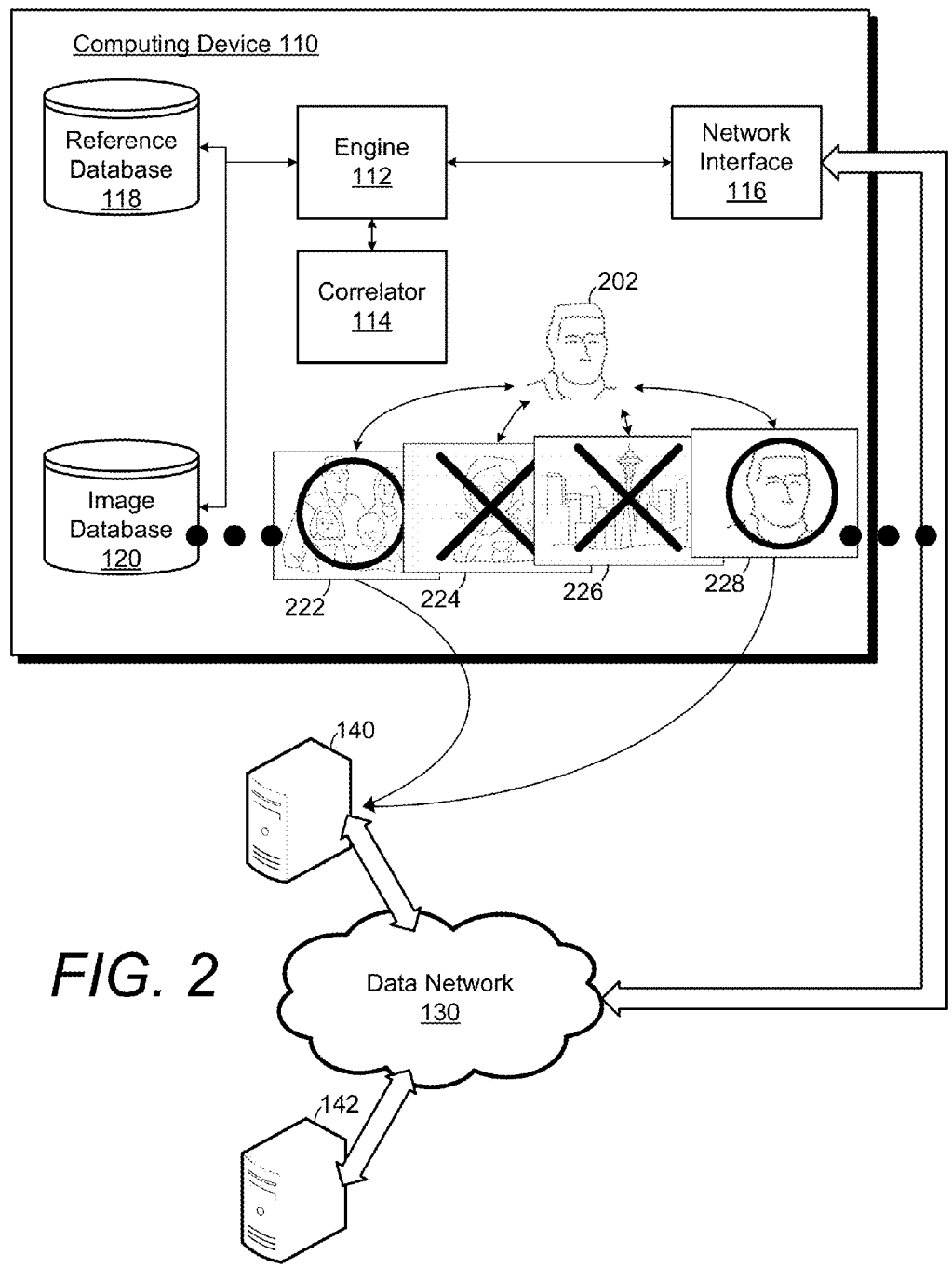
FIG. 2 illustrates certain operational aspects of the device and network for image subset determination and processing of FIG. 1 according an example embodiment.

FIG. 2 illustrates certain operational aspects of the computing device 110 and network 130 of FIG. 1 according an example embodiment. In FIG. 2, the engine 112 has accessed the reference and image databases 118 and 120 to retrieve both a reference for correlation 202, and a set of images including images 222, 224, 226, and 228 for processing by the correlator 114. Any image of the images 222, 224, 226, and 228 may have been directly captured by the computing device 110 by an image sensor of the computing device 110, for example, or have been stored or uploaded to the computing device 110 from a separate device such as a camera.

In FIG. 2, the correlator 114 compares the reference for correlation 202 with each of the images 222, 224, 226, and 228, to determine images that include features similar to those in the reference for correlation 202. As illustrated in FIG. 2, the correlator 114 determines that images 222 and 228 include features (e.g., facial features) similar to those in the reference for correlation 202, because images 222 and 228 each include the features of the person captured by the reference 202. In turn, the engine 112 is configured to organize the images 222 and 228 into a subset of images that correlate with or match the reference for correlation 202. Additionally, based on a post-selection processing rule, the engine 112 is configured to transfer the subset of images 222 and 228 to the server 140. As described in further detail below, the server 140 may comprise a server that hosts a social networking website or other image sharing or distribution website.

Using the process described above, the determination of a subset of images that includes features of a reference image, and the transfer of that subset of images, is automated. In certain situations, it can be appreciated that it may desirable to separate images that include or do not include representations of a certain person (or persons) from a set of images, before images are transferred or uploaded. For instance, before uploading images to a server for display on a user's account of a social networking website or service, it may be desirable to select only images that include an image of the user. As another example, before uploading images to a server, it may be desirable to upload only images that do not include images of a child or minor, for privacy concerns. Especially in cases where many images are involved, it can be difficult to efficiently determine a desired subset of images in view of these considerations.

According to aspects described herein, a subset of images may be quickly determined. Embodiments described herein may also rely upon one or more processing rules to further automate a timing at which a subset is generated, the selection of a reference for correlation, the selection of a subset of images for comparison with the reference, post-selection processing of the subset of images, and the transfer of the subset of images to a server. Further, certain embodiments include the use of an onset rule. Using an onset rule, the processes described herein may be triggered by a certain timing, location, or resource-based rule of the device 110. Similarly, using a subset post-selection rule, one or more image processing, saving, deleting, transfer, or other activity may be further automated.

Figure 3:
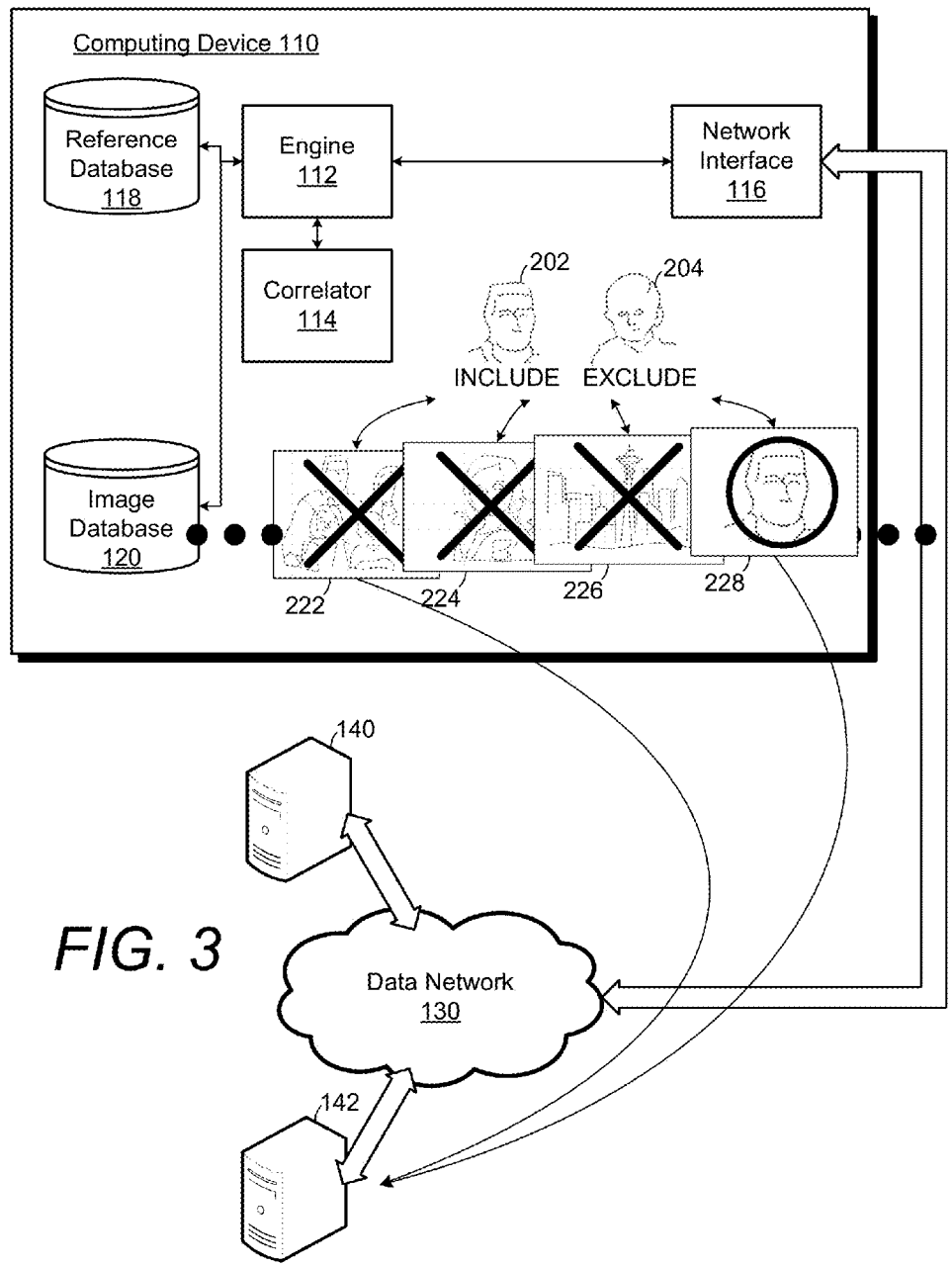
FIG. 3 illustrates other operational aspects of the device and network for image subset determination and processing of FIG. 1 according to an example embodiment.

FIG. 3 illustrates other operational aspects of the computing device 110 and network 130 of FIG. 1 according an example embodiment. In the embodiment illustrated in FIG. 3, two references for correlation 202 and 204 are relied upon by the correlator 114. In this case, the reference 202 comprises a reference for inclusion and the reference 204 comprises a reference for exclusion. The references 202 and 204 are each correlated against the subset of images 222, 224, 226, and 228. As compared to the embodiment illustrated in FIG. 2, although the image 222 matches with the reference for inclusion 202, the image 222 also matches the reference for exclusion 204. Thus, the engine 112 and correlator 114 are configured to exclude the image 222 from the subset of images because it correlates with the reference for exclusion 204—despite the fact that it correlates with the reference for inclusion 202. In other words, any image that correlates with the reference for exclusion 204 is omitted or excluded from the determined subset of images. In the embodiment of FIG. 3, the engine 112 is configured to transfer the image 228 to the server 142, as part of a post-selection processing rule.

In connection with FIG. 3, it is noted that the computing device 110 may be relied upon to efficiently determine a subset of images that not only includes certain images but also excludes certain images. Thus, the computing device 110 provides a flexible means to process very large numbers of images and determine subsets from those images that meet certain predetermined requirements. The logic including a reference for inclusion and a reference for exclusion is provided by way of example and is not intended to be limiting of the embodiments described herein. In other words, determination of a subset of images may be performed with one or more references for inclusion and one or more references for exclusion, and the application of various logical operations including AND, OR, XOR, and NOR operations, among others, may be relied upon during subset determination.

Figure 4A:
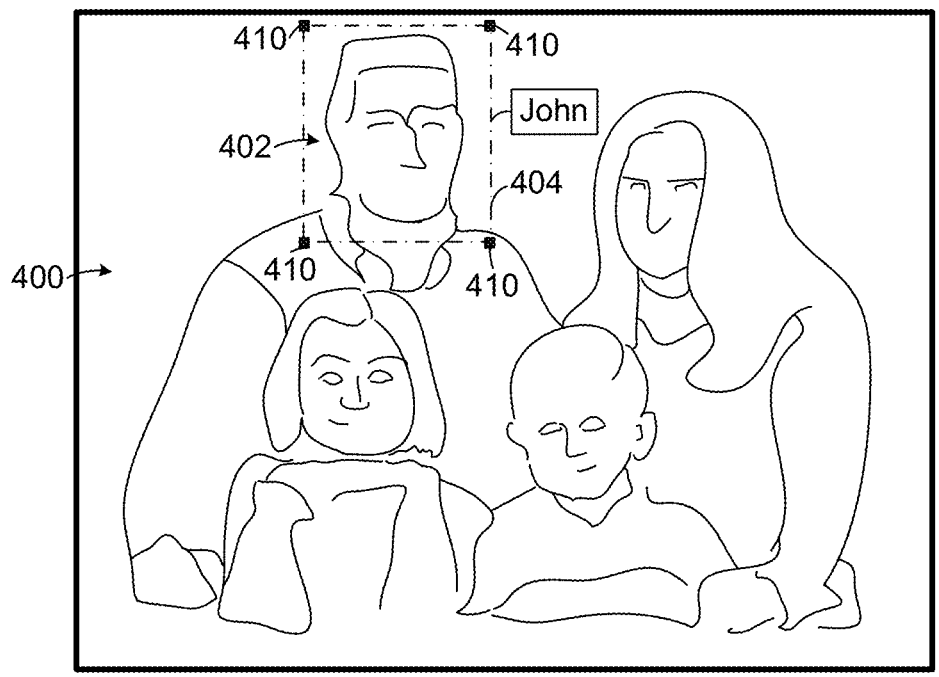
FIG. 4A illustrates an example image and selection of a portion of the image as a reference for correlation.

FIG. 4A illustrates an example image 400 and selection of a portion 402 of the image 400 as a reference for correlation. In FIG. 4A, a user is able to select the portion 402 of the image 400 by adjusting anchors 410 of a bounding box 404. However, other means for selecting the portion 402 of the image 400 are within the scope and spirit of the embodiments described herein. Additionally, the user is able to define a reference name for the portion 402 of the image 400. As illustrated in FIG. 4A, the portion 402 of the image 400 is identified as "John". By defining or identifying a reference portion of an image, a database of image references may be created with a simple indexing system, for subset determination. Such a database of image references may be stored in the reference database 118, for example. Thus, it may not be necessary for a user to identify a portion of an image as a reference for correlation each time a subset is determined. Instead, when determining a subset of images, the correlator 114 may rely upon a previously-determined reference.

In certain circumstances, when a reference for correlation from the reference database 118 is used to determine a subset of images, the computing device 110 is configured to receive feedback from a user to further refine the reference. For example, when determining a subset of images using a reference for correlation from the reference database 118, a user may indicate which images in the subset of images were determined as correct and incorrect matches. If an image in the subset was incorrectly identified as a match by the correlator 114, feedback may be provided by the user indicating that the image did not actually match with the reference for correlation. In such a case, the reference database 118 may be updated by the engine 112 with further data for better accuracy. In other words, after a subset of images is determined using an image reference from the database 118, the engine 112 may be configured to receive feedback based on an evaluation of subset accuracy and update the reference database 118 according to the feedback. For example, attributes or aspects of the image reference used for the subset determination may be updated or refined based on a further analysis of the image included in error. In this manner, the reference database 118 may be further refined over time as part of a learning model.

Figure 4B:
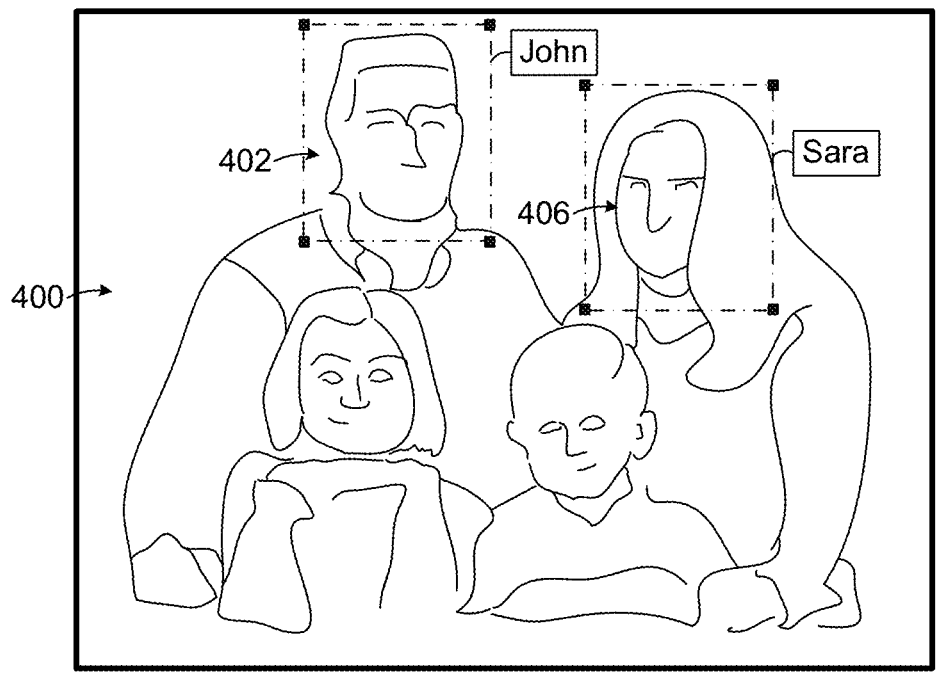
FIG. 4B illustrates an example image and selection of certain portions of the image as references for correlation.
Figure 4C:
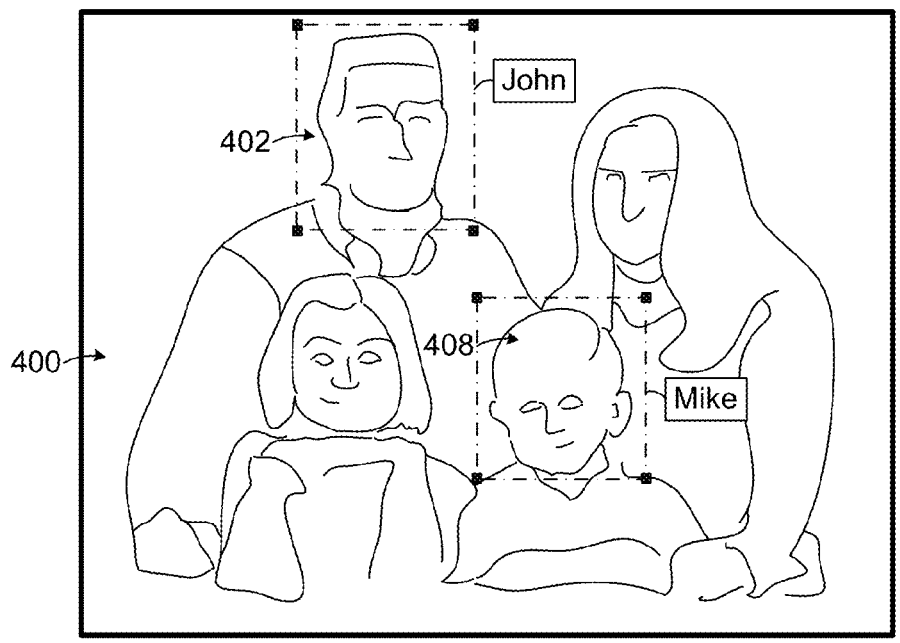
FIG. 4C illustrates an example image and selection of certain portions of the image as references for inclusion and exclusion.

FIG. 4B illustrates the example image 400 and selection of certain portions 402 and 406 of the image 400 as references for correlation. As illustrated in FIG. 4C, more than one reference for correlation may be selected from one image. In FIG. 4C, the references for correlation 402 and 406 are both selected from the image 400. The reference for correlation 406 is identified, associated, or named "Sara". Although not indicated in FIG. 4B, each of the references for correlation 402 and 406 may be selected as a reference for inclusion or exclusion.

FIG. 4C illustrates the example image 400 and selection of portions 402 and 408 as references for correlation. In FIG. 4C, the references for correlation 402 and 408 are both selected from the image 400. The reference for correlation 408 is identified, associated, or named "Mike". Again, although not indicated in FIG. 4C, each of the references for correlation 402 and 408 may be selected as a reference for inclusion or exclusion. For example, according to the example embodiment illustrated in FIG. 3, a subset of images may be determined by relying upon the reference for correlation 402 as a reference for inclusion and relying upon the reference for correlation 408 as a reference for exclusion.

Figure 4D:
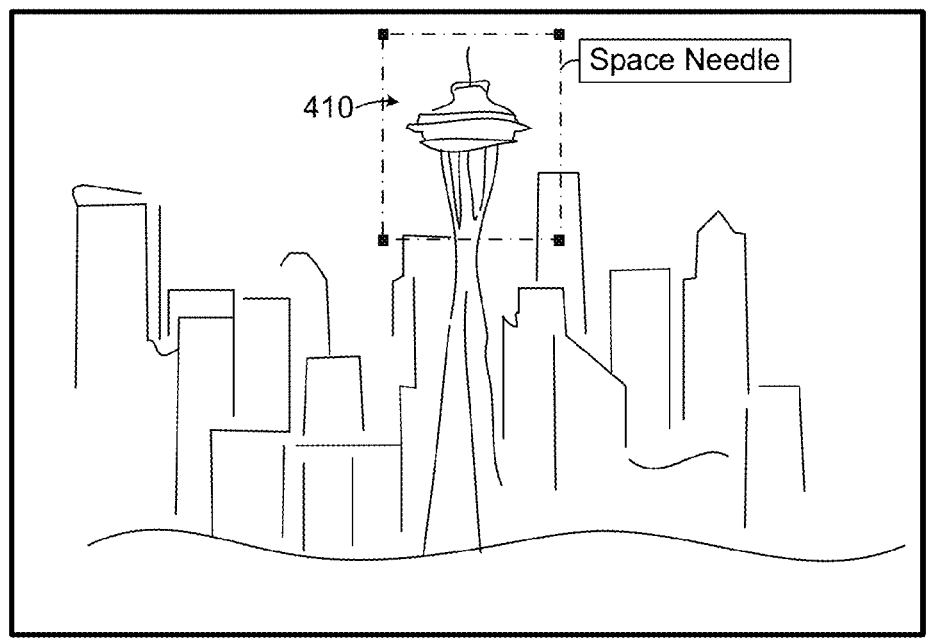
FIG. 4D illustrates an example image and selection of a portions of the image as a landmark reference for correlation.

Although the references for correlation 402, 406, and 408 above are associated with faces or facial features of individuals, it is noted that the embodiments described herein are not limited to determining subsets based on correlations with facial features. Instead, other features of images may be relied upon to determine subsets of images. As illustrated in FIG. 4D, a skyline landmark may be chosen, as illustrated by the selection of the reference for correlation 410. The reference for correlation 410 may be identified, associated, or named. In the example illustrated in FIG. 4D, the reference for correlation 410 is identified by the reference name "Space Needle". As suggested above, the reference name may be provided by a user when the reference is selected by a bounding box by a user, for example, or at another time.

In addition to an attributed reference name, any of the references for correlation 402, 406, 408, and 410 may additionally be associated with metadata or similar information such as time of day, geographic location (e.g., latitude, longitude, altitude, azimuth), and camera data (e.g., camera model, pixel size, ISO, flash mode), for example. The metadata may be relied upon by the correlator 114 when determining a subset of images. For example, because each image in a set of images for comparison may also include metadata or information such as time of day, geographic location, and camera data, the correlator 114 may compare this information with metadata of one or more references for correlation. Thus, in addition to comparing image features between a reference for correlation and a set of images, the correlator 114 may compare metadata between the reference for correlation and the set of images. In certain embodiments, the comparison of image features is relied upon by the correlator 114 as a primary metric in a correlation, while the comparison of metadata is relied upon by the correlator 114 as a secondary metric. In other embodiments, the comparison of image features is a secondary metric to the comparison of metadata. In still other embodiments, a weighted average of image and metadata comparisons is relied upon by the correlator 114. Other comparison variations are within the scope and spirit of the embodiments described herein.

Figure 5:
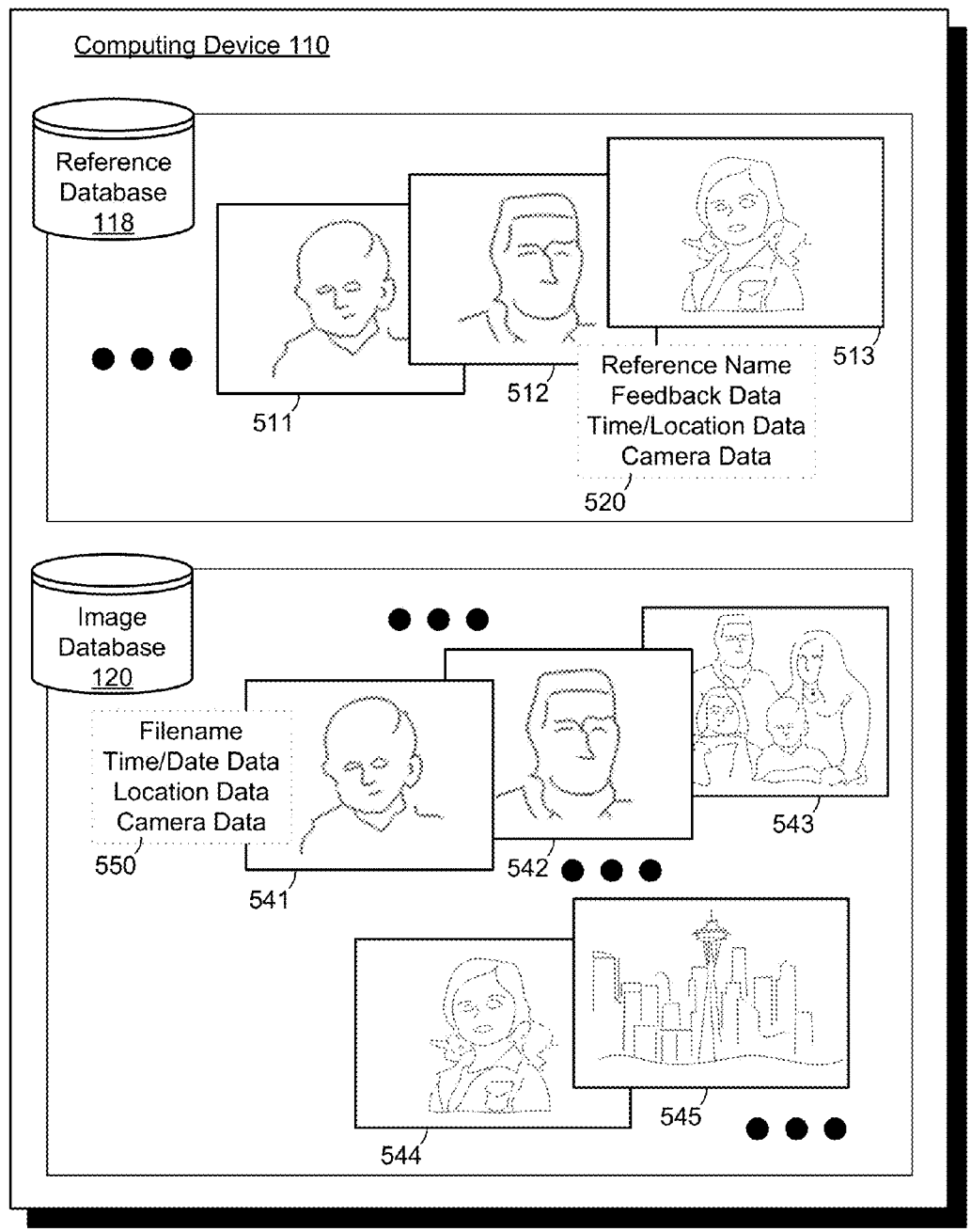
FIG. 5 illustrates example contents of reference and image databases according to certain aspects of an example embodiment.

FIG. 5 illustrates example contents of reference and image databases according to certain aspects of an example embodiment. As illustrated in FIG. 5, the reference database 118 comprises references for correlation 511, 512, and 513, among others. The image database 120 comprises images 541, 542, 543, 544, and 545, among others. Each of the references for correlation comprises metadata 520 including reference name, feedback data, time and date data, location data, and camera data. Each of the images also comprises metadata 550 including filename, time and date data, location data, and camera data. It is noted that the metadata 520 and the metadata 550 will vary for each reference for correlation and each image for comparison. Although examples of the metadata 520 and the metadata 550 are provided, the examples are provided by way of example only and are not intended to be limiting in nature. As discussed above, the correlator 114 may rely upon any of the data 520 and 550 when correlating a reference with a set of images.

FIG. 6 illustrates an example interface of a subset routine menu according to an example embodiment. In the menu, a user may select a name for a particular routine, and the routine may be saved or defined for later use. The computing device 110 may store one or more routines and monitor rules associated with the one or more routines as directed by a user or as an ongoing processing task.

As illustrated in FIG. 6, onset and subset rules, for example, may be selected or defined for a routine. Example onset rules include time, date, location, available memory, available battery capacity, or available communication signal strength rules. As further described below, the computing device 110 may monitor an onset rule of a subset routine, to determine whether to execute the routine. In other words, when conditions of the rule are met, the computing device 110 may be configured to execute a defined subset routine. As suggested by the onset rules illustrated in FIG. 6, a subset routine may be executed at a particular time, on a particular date, or when a computing device is positioned within a certain distance from a particular geographic location. As other examples, a subset routine may be executed based upon a remaining available memory, available battery capacity, or available communication signal strength of the computing device 110. In certain cases, a value or threshold of an onset rule may be specified by a user. For example, if the available memory onset rule is selected for a subset routine, a user may select an amount of available memory as a threshold condition of the rule. The available memory onset rule may be particularly helpful to prevent images from crowding available memory of the computing device 110. For instance, a subset routine may be defined with an onset rule that specifies execution of the routine when an available memory falls below a certain threshold. In this case, when the available memory falls below the threshold, a subset of images may be determined and uploaded to an alternative storage means to free memory capacity on the computing device 110.

Example subset rules include save, delete, upload, or post-process rules. As a post-selection task, after a subset of images is determined, the computing device 110 may perform additional processing in connection with the subset. In certain embodiments, after a subset of images is determined, the computing device 110 may perform additional processing in connection with the set of images that were excluded from the subset.

As suggested by the subset rules illustrated in FIG. 6, post-selection processing may include saving, deleting, uploading, or image post-processing. That is, one or more of the images of the subset may be saved to a certain storage location (i.e., directory path) on the computing device 110 and possibly renamed at the same time. Additionally or alternatively, one or more of the images of the subset may be deleted from the computing device 110. Further, one or more of the images of the subset may be uploaded from the computing device 110 to another storage location such as a server computer operating a service, social networking website, or other image sharing or distribution service, for example. In this context, the user may be permitted to specify a path or Uniform Resource Locator (URL) for reaching the server computer and a login username and password for access to the server computer.

In other aspects, one or more of the images of the subset may be processed with an image post-processing algorithm by the computing device 110. The post-processing algorithm may include image filesize or filetype conversion, sharpening, color desaturation, filtering, or other operation, without limitation. It is noted that the post-selection processing examples described above are provided by way of example only and are not intended to be limiting in nature as other processes are within the scope and spirit of the embodiments described herein. Further, more than one post-selection processing routine may be applied in a certain sequence or combination.

As further illustrated in FIG. 6, a user is permitted to specify one or more images for comparison. That is, the user is permitted to specify the image or images from which a subset may be determined. As non-limiting examples, the images may be specified by directory path or date range of image capture, although any other manner of selection is within the scope of the embodiments described herein. Additionally, the user is permitted to specify one or more references for correlation. As discussed above, both references for inclusion and exclusion may be specified, by reference name (e.g., "John," "Sara," "Mike") or any other manner.

It is noted that the menu illustrated in FIG. 6 is provided by way of example only, as definition of a routine for subset classification and processing according to the aspects described herein may be achieved according to various interfaces and/or menus.

Figure 7:
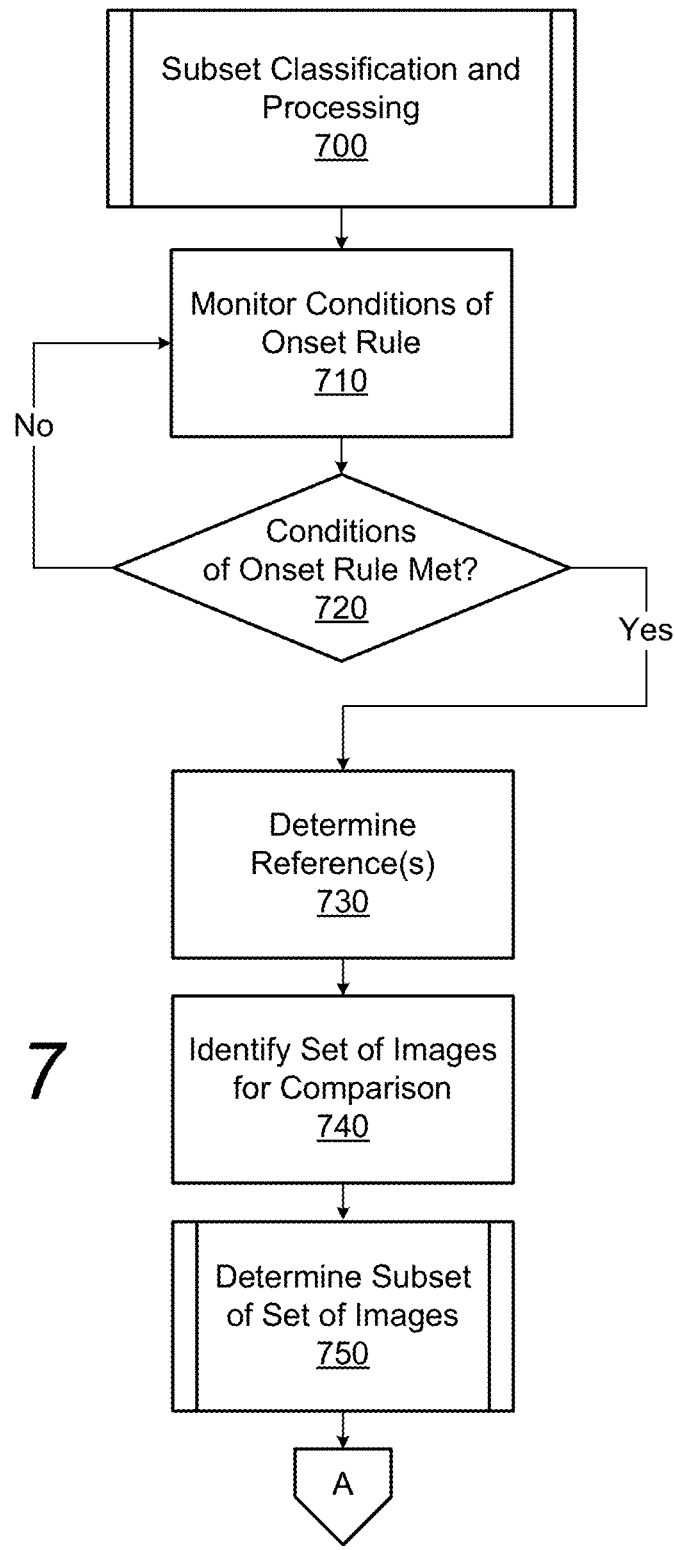
FIG. 7 illustrates a process flow diagram of a method for subset classification and processing according to an example embodiment.
Figure 8:
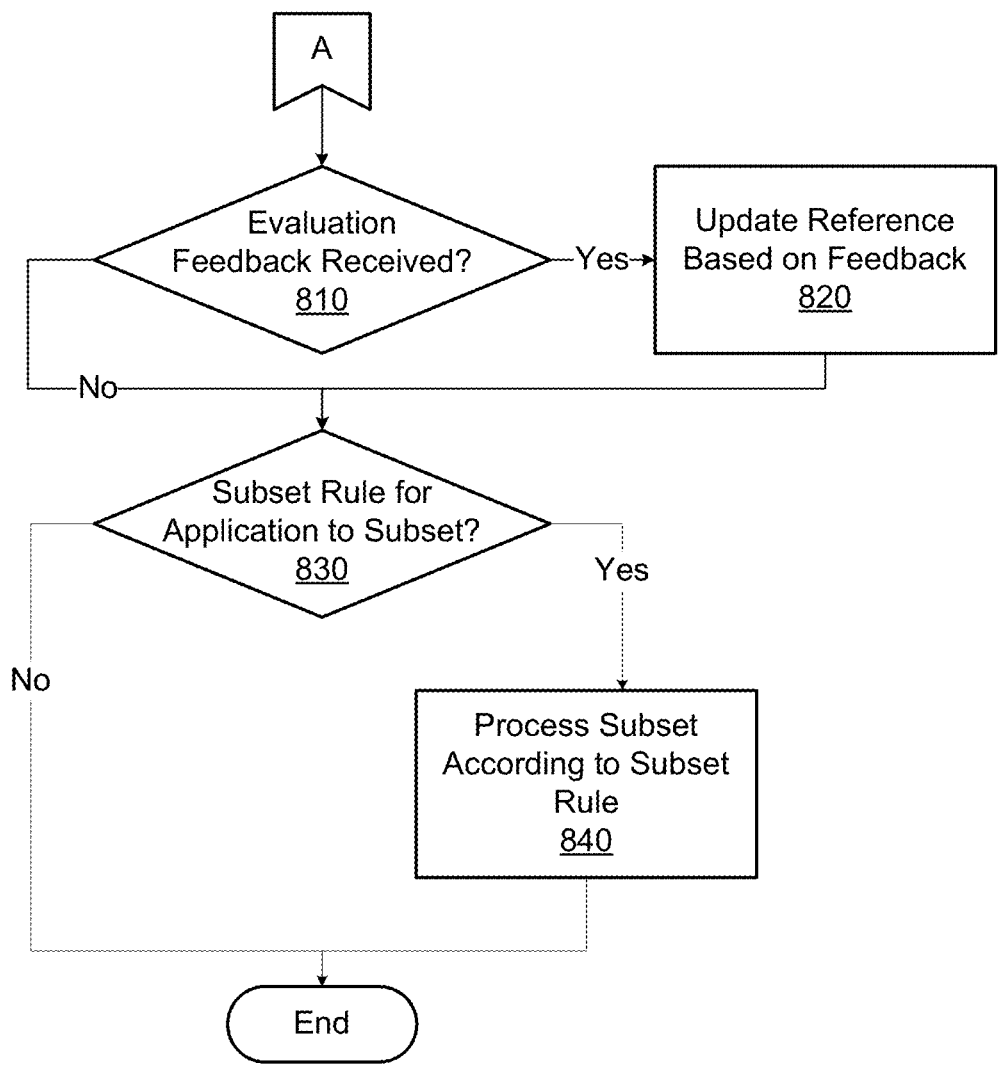
FIG. 8 further illustrates a process flow diagram of a method for subset classification and processing according to an example embodiment.
Figure 9:
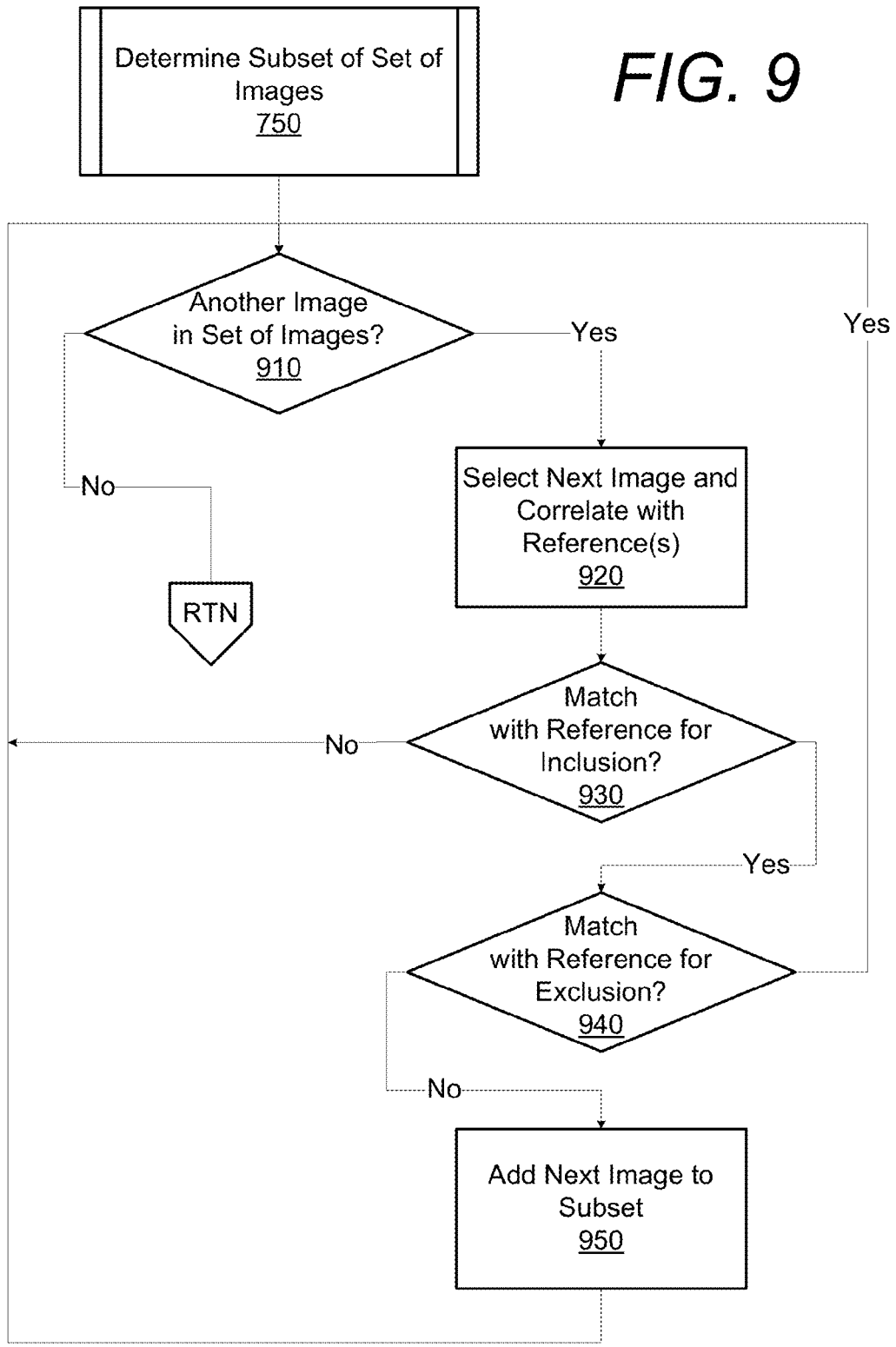
FIG. 9 illustrates a process flow diagram of a method for determining a subset of a set of images according to an example embodiment.

Referring next to FIGS. 7-9, flowcharts illustrating an example process of image subset determination and processing. In certain aspects, the flowcharts of FIGS. 7-9 may be viewed as depicting an example of steps performed by the computing device 110 according to one or more embodiments. For embodiments including software, each element of the flowcharts of FIGS. 7-9 may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a general purpose processor. For hardware embodiments, each item may represent a circuit or a number of interconnected circuits to implement the specified logical function(s).

Although the flowcharts of FIGS. 7-9 illustrate an order, it is understood that the order may differ from that depicted. For example, the order of two or more logical functions may be scrambled relative to that shown. Also, two or more logical functions shown in succession may be executed concurrently or with partial concurrence. In some embodiments, one or more of the logical functions shown in FIGS. 7-9 may be skipped or omitted. In addition, any number of counters, state variables, warning semaphores, or messages might be added to the logical flow illustrated, for purposes of enhanced utility, accounting, performance measurement, or troubleshooting, etc. It is understood that all such variations are within the scope of the present disclosure.

Turning to FIG. 7, a process flow diagram of a method 700 for subset classification and processing according to an example embodiment is illustrated. At reference 710, conditions of an onset rule are monitored. As one example, engine 112 of the computing device 110 may monitor conditions of an onset rule. At reference 720, it is determined whether conditions of the onset rule have been met. If so, the process proceeds to reference 730, where at least one reference for correlation is determined. If, at reference 720, the conditions of the onset rule have not been met, the process proceeds back to reference 710 where the conditions of the onset rule are further monitored. The determination of one or more references for correlation at reference 730 may be achieved by any of the examples described above, such as by selection of a portion of an image or specifying a pre-selected reference.

At reference 740, a set of images for comparison is identified. Particularly, a set of images for comparison with the reference for correlation is identified at reference 740. Again, the identification of the set of images may be achieved according to any one of the examples described above, such as by selection of all images within a directory or all images captured within a certain date range. In the context of the computing device 110, the set of images for comparison with the reference for correlation may be stored in any storage means within the computing device 110. Any of the images of the set of images for comparison may have been directly captured by the computing device 110 by an image sensor of the computing device 110, for example, or have been stored or uploaded to the computing device 110 from a separate device such as a camera. At reference 750, a subset of the set of images is determined based on a correlation between the reference determined at 730 and the set of images identified at 740. Determination of the subset at 750 is further described below in connection with FIG. 9.

Turning to FIG. 8, the method 700 is further illustrated. At reference 810, it is determined whether any evaluation feedback has been received from a user. If evaluation feedback has been received, the process proceeds to reference 820 where attributes of the reference for correlation are updated based on the feedback. As discussed above, a user may provide feedback related to the subset of images determined at reference 750, and this feedback may be used to further define the reference for correlation used to determine the subset. In other words, attributes or aspects of the reference for correlation may be updated or refined if an image of the subset determined at 750 was included (or excluded) in error, as discussed above. If no evaluation feedback is received at reference 810, the process proceeds to reference 830.

At reference 830, it is determined whether there is a subset rule for application to the subset determined at reference 750. If a subset rule is available or specified for further processing, the process proceeds to reference 840 where the subset is processed according to the subset rule. Examples of processing according to one or more subset rules are described above. For example, one or more images of the subset may be saved, deleted, transferred, or processed according to an image post-processing rule. If it is determined that no subset rule for application is available at reference 830, the process ends without any additional post-selection processing to the subset.

FIG. 9 illustrates a process flow diagram of a method 750 for determining a subset of a set of images according to an example embodiment. At reference 910, it is determined whether there is another (i.e., a "next") image in the set of images for processing. In other words, at 910, is determined whether another image from the set of images determined at reference 740 remains for evaluation. If no next image is available, the process returns. If a next image is available, the process proceeds to reference 920 where the next image is correlated with the one or more references for correlation determined at reference 730. For example, the correlator 114 may correlate the next image based on a comparison of pixels between the image and the one or more references for correlation determined at reference 730. Additionally or alternatively to a pixel comparison, the correlator 114 may rely upon other metrics or heuristics for determining whether the image is similar or a match to the one or more references for correlation. As suggested above, an image may be determined to be similar to a reference for correlation based upon timing- or location-based comparisons in addition to pixel-based comparisons. It is also noted that the one or more references for correlation may include both one or more references for inclusion and one or more references for exclusion.

Proceeding to reference 930, it is determined whether the next image is a match with the one or more references for correlation. Particularly, it is determined whether the next image is a match with one or more references for inclusion. If no match was determined with a reference for inclusion, the process proceeds back to reference 910, where it is determined whether another image remains for processing within the set of images. It is noted here that each image in a set of images may be processed individually, for all images within the set. Alternatively, if a match was determined at reference 930, the process proceeds to reference 940, where it is determined whether the next image is a match with one or more references for exclusion. If a match was determined with a reference for exclusion, the process proceeds back to reference 910. Alternatively, if no match was determined with a reference for exclusion, the process proceeds to reference 950 where the next image is added to a subset of images. The process then continues back to reference 910.

Figure 10:
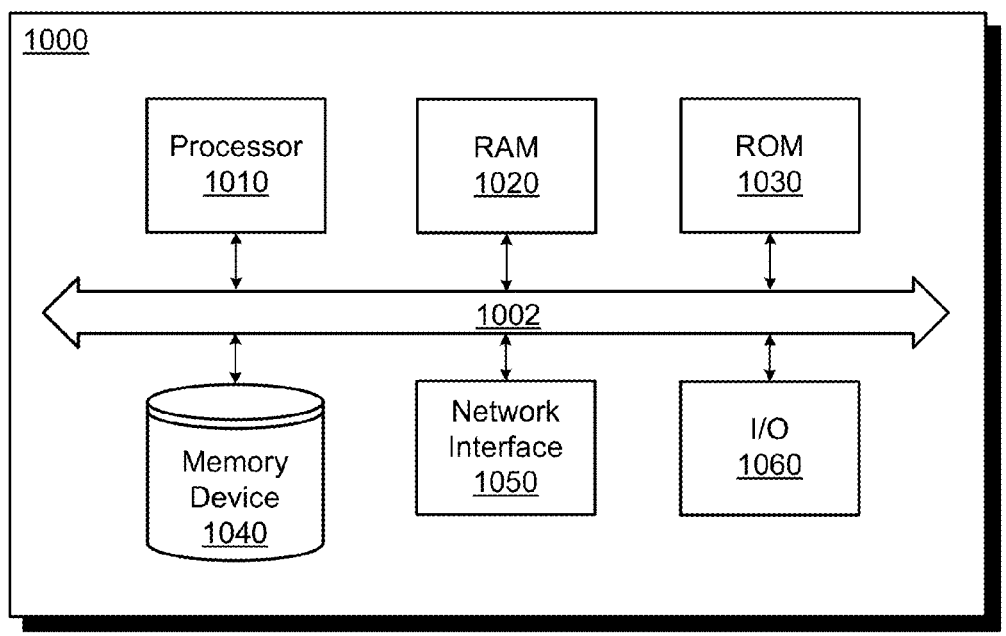
FIG. 10 illustrates an example hardware diagram of a general purpose computer according to an example embodiment.

Turning to FIG. 10, an example hardware diagram of a general purpose computer 1000 is illustrated. The computing device 110 may be embodied, in part, using one or more elements of the general purpose computer 1000. The computer 1000 includes a processor 1010, a Random Access Memory ("RAM") 1020, a Read Only Memory ("ROM") 1030, a memory device 1040, a network interface 1050, and an Input Output ("I/O") interface 1060. The elements of the computer 1000 are communicatively coupled via a bus 1002. The elements of the computer 1000 are not intended to be limiting in nature, as it may further include a display, a display interface, and speakers, among other elements. Likewise, it should be appreciated that the computing device 110 may include a display, a display interface, and speakers, among other elements.

In various embodiments, the processor 1010 may comprise any well known general purpose arithmetic processor, state machine, or Application Specific Integrated Circuit ("ASIC"), for example. The RAM and ROM 1020 and 1030 comprise any well known random access or read only memory device that stores computer-readable instructions to be executed by the processor 1010. The memory device 1030 stores computer-readable instructions thereon that, when executed by the processor 1010, direct the processor 1010 to execute various aspects of the embodiments described herein. When the processor 1010 comprises a state machine or ASIC, the processes described herein may be executed by the state machine or ASIC according to a specialized or embedded circuitry design, by firmware, or a combination of a circuitry and firmware. As a non-limiting example group, the memory device 1040 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1050 comprises hardware interfaces to communicate over data networks. The I/O interface 1060 comprises device input and output interfaces such as keyboard, pointing device, display, communication, and other interfaces. The bus 1002 electrically and communicatively couples the processor 1010, the RAM 1020, the ROM 1030, the memory device 1040, the network interface 1050, and the I/O interface 1060, so that data and instructions may be communicated among them.

In operation, the processor 1010 is configured to retrieve computer-readable instructions stored on the memory device 1040, the RAM 1020, the ROM 1030, or another storage means, and copy the computer-readable instructions to the RAM 1020 or the ROM 1030 for execution, for example. The processor 1010 is further configured to execute the computer-readable instructions to implement various aspects and features of the embodiments described herein. For example, the processor 1010 may be adapted and configured to execute the processes described above with reference to FIGS. 7-9, including the processes described as being performed by the computing device 110. Also, the memory device 1040 may store the data stored in the databases 118 and 120.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the features defined in the following claims, the scope of which are to be accorded the broadest interpretation so as to encompass modifications and equivalent structures.

The invention claimed is:

1. A method for subset determination, comprising:
monitoring a condition of an onset rule, the onset rule including a predetermined user condition;
selecting a plurality of portions of an image, each of the plurality of portions including a corresponding object;
determining, when the condition of the onset rule is satisfied, the corresponding objects in the image as references for correlation with at least one image;
identifying a set of images for comparison with the references;
identifying the corresponding objects within the set of images based on a correlation between the references and the set of images;
determining, by a processor, a subset of the set of images based on the correlation between the references and the set of images; and
processing the subset of the set of images according to application of a subset rule.

2. The method of claim 1, wherein the references comprise an image reference metric from a database of predefined image references.

3. The method of claim 2, further comprising:
receiving feedback based on an evaluation of subset accuracy; and
updating the database of the predefined image references according to the feedback.

4. The method of claim 1, further comprising:
monitoring conditions of the onset rule; and
when the conditions of the onset rule are satisfied, prompting for selection of the references for correlation or identifying the references for correlation according to a parameter of a predetermined subset routine.

5. The method of claim 4, wherein:
the onset rule comprises at least one of a timing-, location-, or resource-based rule,
the timing-based rule comprises one of a time of day, day of week, or predetermined date rule,
the location-based rule comprises one of a relative or absolute location rule, and
the resource-based rule comprises one of an available memory capacity, available battery level, or available communications signal strength rule.

6. The method of claim 1, wherein the processing the subset comprises transferring the subset of the set of images to a predetermined destination according to a parameter of a predetermined subset routine.

7. The method of claim 1, wherein the determining the subset of the set of images comprises, for each image of the set of images, correlating the image of the set of images with the references for correlation to determine whether a portion of the image of the set of images correlates with the references by at least a predetermined correlation threshold.

8. The method of claim 1, wherein the determining the subset of the set of images further comprises determining the subset based in part on metadata of the set of images.

9. The method of claim 1, wherein:
the references for correlation comprise a reference for inclusion and a reference for exclusion, and
the determining the subset of the set of images comprises, for each image of the set of images:
correlating the image of the set of images with the references for inclusion and exclusion;
adding the image of the set of images to the subset of the set of images when the image of the set of images correlates with the reference for inclusion and does not correlate with the reference for exclusion; and
excluding the image of the set of images from the subset of the set of images when the image of the set of images correlates with the reference for exclusion.

10. The method of claim 1, further comprising:
determining whether the subset of the set of images is assigned the subset rule prior to processing the subset of the set of images according to application of the subset rule.

11. A non-transitory computer-readable medium storing computer readable instructions thereon that, when executed by a processor, direct the processor to perform a method for subset determination, comprising:
selecting a plurality of portions of an image, each of the plurality of portions including a corresponding object;
monitoring a condition of an onset rule, the onset rule including a predetermined user condition;
determining, when the condition of the onset rule is satisfied, the corresponding objects in the image as references for correlation with at least one image;
identifying the corresponding objects within a set of images based on a correlation between the references and the set of images;
determining a subset of the set of images based on the correlation between the references and the set of images; and
processing the subset of the set of images according to application of a subset rule.

12. The non-transitory computer-readable medium of claim 11, further comprising:
receiving feedback based on an evaluation of subset accuracy; and
updating a database of predefined image references according to the feedback.

13. The non-transitory computer-readable medium of claim 11, further comprising, when conditions of the onset rule are satisfied, prompting for selection of the references for correlation or identifying the references for correlation according to a parameter of a predetermined subset routine.

14. The non-transitory computer-readable medium of claim 11, wherein:
the onset rule comprises at least one of a timing-, location-, or resource-based rule,
the timing-based rule comprises one of a time of day, day of week, or predetermined date rule,
the location-based rule comprises one of a relative or absolute location rule, and
the resource-based rule comprises one of an available memory capacity, available battery level, or available communications signal strength rule.

15. The non-transitory computer-readable medium of claim 11, wherein:
the references for correlation comprise a reference for inclusion and a reference for exclusion, and
the determining the subset of the set of images comprises, for each image of the set of images:
correlating the image of the set of images with the references for inclusion and exclusion;
adding the image of the set of images to the subset of the set of images when the image of the set of images correlates with the reference for inclusion and does not correlate with the reference for exclusion; and
excluding the image of the set of images from the subset of the set of images when the image of the set of images correlates with the reference for exclusion.

16. An apparatus for subset determination, comprising:
a memory that stores data and images; and
a processor communicatively coupled to the memory and configured to:
select a plurality of portions of an image, each of the plurality of portions including a corresponding object;
monitor a condition of an onset rule, the onset rule including a predetermined user condition;
determine, when the condition of the onset rule is satisfied, the corresponding objects in the image as references for correlation with at least one image;
identify the corresponding objects within a set of images based on a correlation between the references and the set of images; and
determine a subset of the set of images based on the correlation between the references and the set of images.

17. The apparatus of claim 16, wherein the processor is further configured to:
receive feedback based on an evaluation of subset accuracy, and
update a database of predefined image references according to the feedback.

18. The apparatus of claim 16, wherein the processor is further configured to, when conditions of the onset rule are satisfied, prompt for selection of the references for correlation or identify the references for correlation according to a parameter of a predetermined subset routine.

19. The apparatus of claim 16, wherein:
the onset rule comprises at least one of a timing-, location-, or resource-based rule,
the timing-based rule comprises one of a time of day, day of week, or predetermined date rule,
the location-based rule comprises one of a relative or absolute location rule, and the resource-based rule comprises one of an available memory capacity, available battery level, or available communications signal strength rule.

20. The apparatus of claim 16, wherein:

the references for correlation comprises a reference for inclusion and a reference for exclusion, and the processor is further configured to, for each image of the set of images:
- correlate the image of the set of images with the references for inclusion and exclusion,
- add the image of the set of images to the subset of the set of images when the image of the set of images correlates with the reference for inclusion and does not correlate with the reference for exclusion, and
- exclude the image of the set of images from the subset of the set of images when the image of the set of images correlates with the reference for exclusion.

* * * * *